No. 28,699.
I. C. TATE.
GLOBE VALVE.
PATENTED JUNE 12, 1860.
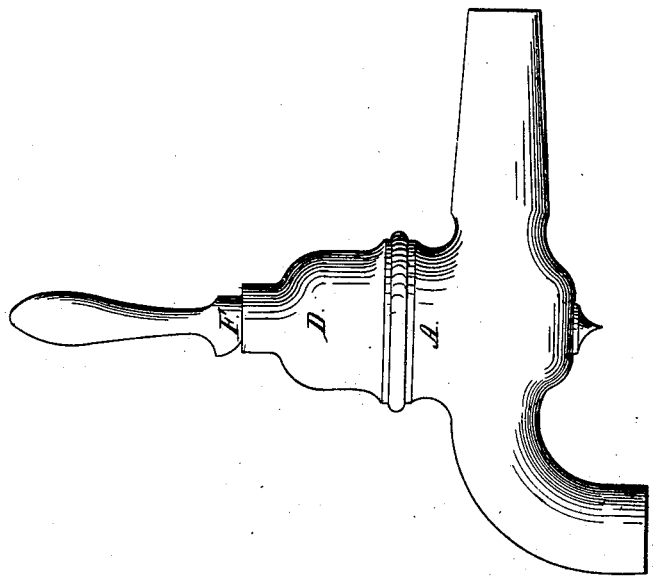
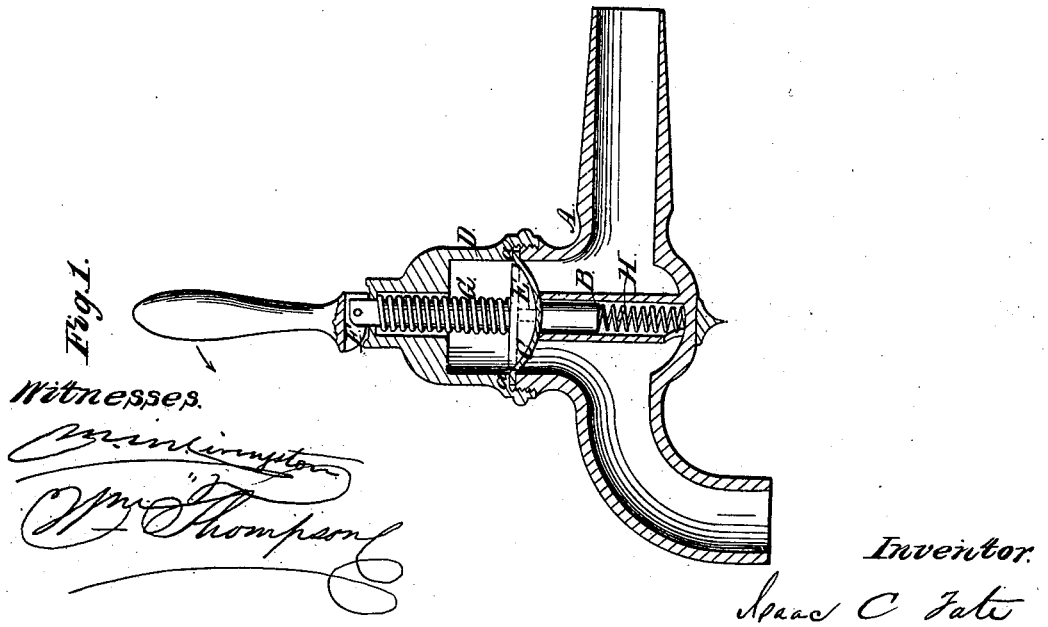

UNITED STATES PATENT OFFICE.

ISAAC C. TATE, OF NEW LONDON, CONNECTICUT.

FAUCET.

Specification of Letters Patent No. 28,699, dated June 12, 1860.

*To all whom it may concern:*

Be it known that I, ISAAC C. TATE, of New London, in the county of New London and State of Connecticut, have invented a new and Improved Faucet; and I do hereby declare that the following is a full, clear, and exact description of the same, reference being had to the accompanying drawing, forming part of this specification, in which—

Figure 1 represents a longitudinal vertical section of my invention. Fig. 2 is a side elevation of the same.

Similar letters of reference indicate corresponding parts in the several figures.

This invention consists in combining with an india rubber diaphragm two springs one for the purpose of depressing the diaphragm and to shut the faucet and the other to force the diaphragm up when the faucet is to be opened, together with a knuckle in combination with the valve and diaphragm and with the two springs for the purpose of raising the valve and to open the faucet.

To enable others skilled in the art to make and use my invention I will proceed to describe its construction and operation with reference to the drawing.

A represents a faucet arranged with a water gate B, and closed by an india rubber diaphragm C. The diaphragm is secured on the upper edge of the faucet by means of a head D, screwing down over said edge and provided with a projecting flange $a$, which cramps the diaphragm between it and the upper edge of the faucet. The diaphragm is depressed by means of a valve E, the stem of which extends through the head D. Said stem is connected to a knuckle F, at the lower extremity of this handle and acting on the upper surface of the head D, in such a manner that on depressing the handle in the direction of the arrow marked near it in Fig. 1, the valve is raised.

A heavy spring G, is placed around the stem of the valve or otherwise arranged so as to force the valve together with the diaphragm down tight on the water gate thereby closing the faucet. By the action of this spring the handle is kept in a vertical position as clearly shown in the drawing. Another light spring H, is placed under the diaphragm for the purpose of raising the same as soon as the valve is lifted. By the arrangement of these two springs the difficulty heretofore existing with faucets of a similar construction are entirely overcome. If the diaphragm is forced down by means of a screw, it depends entirely upon the operator whether he leaves the faucet perfectly closed or half open and at the same time a screw can not be made as cheap as the valve with the simple stem and the spring.

The spring G, closes the faucet whenever the handle is released so that no waste of water or other liquid can occur from the negligence of the attendant. The spring H, on the other hand serves to raise the diaphragm as soon as the valve is lifted, as I have fully described in a patent granted to me on the 14th June 1859.

My faucet is so arranged that the india rubber diaphragm can be renewed whenever it is necessary without disturbing the other parts of the faucet; it closes tight under all circumstances, there is no leakage through the top of the faucet or of the head, and the diaphragm is prevented from sticking by the action of the lower spring.

What I claim as new and desire to secure by Letters Patent is:—

The arrangement and combination of the india-rubber diaphragm C, valve E, heavy spring G, light spring H, and knuckle F, constructed and operating substantially in the manner and for the purpose specified.

ISAAC C. TATE.

Witnesses:
M. M. LIVINGSTON,
CHAS. HUGHES.

UNITED STATES PATENT OFFICE
CERTIFICATE OF CORRECTION

PATENT NO. : RE 28,699
DATED : January 27, 1976
INVENTOR(S) : GORDON L. KELLING

It is certified that error appears in the above-identified patent and that said Letters Patent are hereby corrected as shown below:

Col. 3, line 3: "is" should read --it--
Col. 3, lines 36-37: "interventing" should read --intervening--

Claim 2 should be deleted from the patent. Cancelled by Examiner's Action dated November 13, 1975.

Claim 10, paragraph c, lines 7-9: "being spaced from the top of the reservoir and the bottom of the funnel and" should be italicized as an insertion.

Claim 11, line 11: "heat" should read --head--

Signed and Sealed this first Day of June 1976

[SEAL]

Attest:

RUTH C. MASON
Attesting Officer

C. MARSHALL DANN
Commissioner of Patents and Trademarks